United States Patent
Wakabayashi

(10) Patent No.: US 10,353,494 B2
(45) Date of Patent: Jul. 16, 2019

(54) INFORMATION PROCESSING APPARATUS AND METHOD FOR CONTROLLING THE SAME

(71) Applicant: CANON KABUSHIKI KAISHA, Tokyo (JP)

(72) Inventor: Yuuki Wakabayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 210 days.

(21) Appl. No.: 15/449,690

(22) Filed: Mar. 3, 2017

(65) Prior Publication Data

US 2017/0262087 A1    Sep. 14, 2017

(30) Foreign Application Priority Data

Mar. 8, 2016    (JP) .................................. 2016-044734

(51) Int. Cl.
*G06F 3/038* (2013.01)
*G06F 3/0354* (2013.01)
*G06F 3/0484* (2013.01)
*G06F 3/0488* (2013.01)

(52) U.S. Cl.
CPC .......... *G06F 3/03547* (2013.01); *G06F 3/038* (2013.01); *G06F 3/04842* (2013.01); *G06F 3/04886* (2013.01); *G06F 2203/04803* (2013.01)

(58) Field of Classification Search
CPC .. G06F 3/03547; G06F 3/038; G06F 3/04842; G06F 3/04886; G06F 2203/04803
See application file for complete search history.

(56) References Cited

U.S. PATENT DOCUMENTS

| | | | | |
|---|---|---|---|---|
| 2006/0238495 | A1* | 10/2006 | Davis | G06F 1/1626 345/156 |
| 2014/0359528 | A1* | 12/2014 | Murata | G06F 3/04847 715/833 |
| 2015/0234566 | A1* | 8/2015 | Kanda | G06F 3/04812 345/157 |

FOREIGN PATENT DOCUMENTS

JP    2014-89522 A    5/2014

* cited by examiner

*Primary Examiner* — Robert J Michaud
(74) *Attorney, Agent, or Firm* — Canon USA, Inc., IP Division

(57) ABSTRACT

A method for controlling an information processing apparatus includes setting a cursor operation area in a display area, wherein the cursor operation area is an area other than an area in which a cursor displayed in the display area is movable and other than a keyboard displayed in the display area.

17 Claims, 6 Drawing Sheets

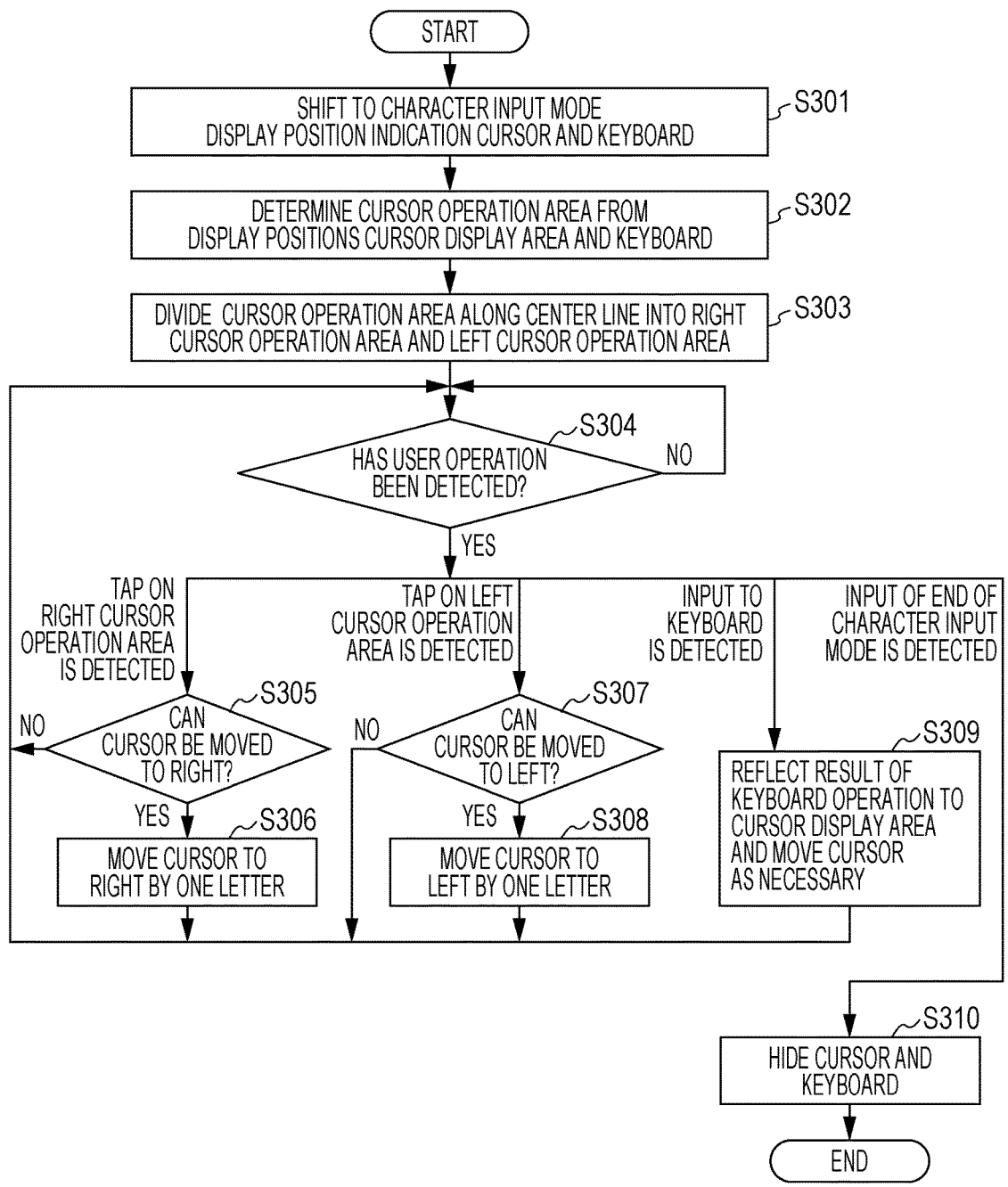

INFORMATION PROCESSING APPARATUS AND METHOD FOR CONTROLLING THE SAME

BACKGROUND

Field

The present disclosure relates to an information processing apparatus and a method for controlling the same.

Description of the Related Art

There is known an information processing apparatus equipped with a touch panel display (hereinafter referred to as "touch device"). The touch device receives an input to a touch display from a user and displays a screen according to the input on the touch display. When an application for displaying a character input by the user is activated, the touch device generally displays a cursor on the touch display to indicate the input position of the character. Japanese Patent Laid-Open No. 2014-89522 discloses a technique for moving a cursor to a position that comes into contact with an operation member, such as a user's finger, or receiving an input with an operation member via a keyboard displayed on the touch display.

As touch devices have increasingly been used in recent years, there has been a demand for further improvement of user-friendliness in moving a cursor displayed on a touch. For example, a technique for moving a cursor to a position in contact with an operation member, as in Japanese Patent Laid-Open No. 2014-89522, has a problem in that the cursor is hidden by the operation member, causing a user operating the cursor to barely view the cursor. Furthermore, a technique for receiving an input by an operation member via a keyboard displayed on a touch display, as in Japanese Patent Laid-Open No. 2014-89522, has a problem in that the user tends to make a mistake in key operation on the keyboard.

SUMMARY OF THE INVENTION

The present disclosure provides a method for controlling an information processing apparatus that displays a cursor between letters displayed in a display area, wherein the cursor is displayed in the display area in a case that a predetermined operation using an operation member is performed on the display area. The method includes the steps of setting a cursor operation area in the display area, the cursor operation area being an area other than an area in which the cursor displayed in the display area is movable and other than a keyboard displayed in the display area, and executing, in a case that a tap operation using an operation member is performed on the cursor operation area in a state in which the cursor is displayed in the display area, a process for moving the cursor in a direction based on an area in the cursor operation area in which the tap operation is performed.

Further features will become apparent from the following description of exemplary embodiments with reference to the attached drawings.

BRIEF DESCRIPTION OF THE DRAWINGS

FIG. 3 is a flowchart for a process of an application according to the first embodiment.

DESCRIPTION OF THE EMBODIMENTS

Information processing apparatuses according to embodiments of the present disclosure will be described hereinbelow with reference to the drawings. It is to be understood that the following embodiments are not intended to limit the present disclosure according to the claims and that not all of combinations of the features described in the embodiments are absolutely necessary for the solution of the disclosure.

First Embodiment

An information processing apparatus to which the present disclosure is applied will be described. In the following embodiments, a mobile terminal is illustrated as an example of the information processing apparatus. The present disclosure can also be applied to any other information processing apparatuses. For example, the present disclosure can be applied to various apparatuses including a touch display on which a cursor can be displayed, such as a notebook personal computer (PC), a tablet terminal, a personal digital assistant (PDA), a digital camera, a music playback device, and a television set. In the embodiments, a smartphone is illustrated as an example of the mobile terminal. The smartphone refers to a multifunctional mobile phone having a camera function, an Internet browser function, a mail function, and other functions, in addition to a mobile phone function.

Figure 1A:
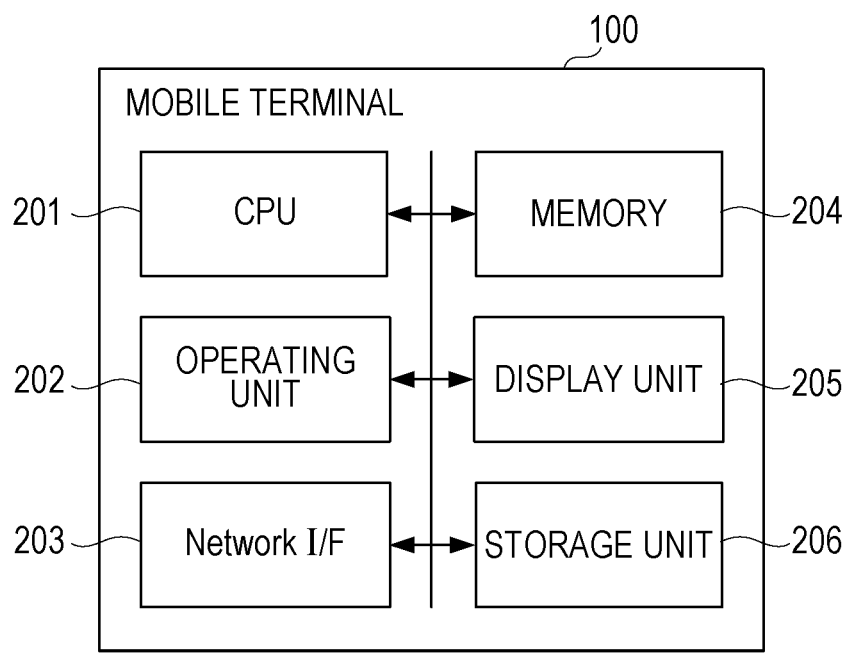
FIG. 1A is a diagram illustrating the hardware configuration of an information processing apparatus according to a first embodiment.
Figure 1B:
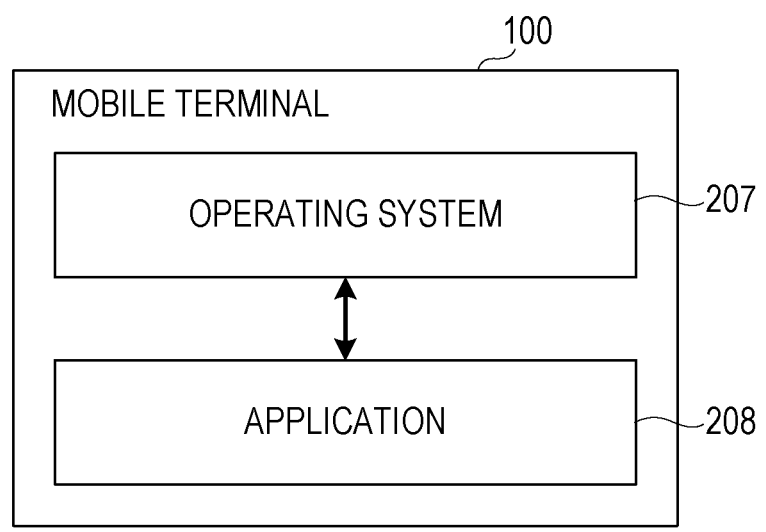
FIG. 1B is a diagram illustrating the software configuration of the information processing apparatus according to the first embodiment.

FIGS. 1A and 1B are diagrams illustrating the configuration of a mobile terminal 100, which is an information processing apparatus of the present embodiment. FIG. 1A illustrates the hardware configuration of the mobile terminal 100, and FIG. 1B illustrates the software configuration of the mobile terminal 100.

The mobile terminal 100 includes a CPU 201, an operating unit 202, a network interface 203, a memory 204, a display unit 205, and a storage unit 206, which are connected to one another via a system bus.

The CPU 201 performs overall control of the mobile terminal 100. The operating unit 202 is an operating unit for the user to provide instructions to the mobile terminal 100 and includes, for example, buttons and a touch panel. The memory 204 is a random-access memory (RAM) serving as a work area for the CPU 201, is used as a temporal storage area for various received data, and is used to store various setting data. An example of the storage unit 206 is a flash memory, in which various control programs, such as an application and an operating system (hereinafter referred to as "OS"), are stored.

The mobile terminal 100 is configured to be connected to a network via the network interface 203 so as to be connected to external devices, such as a printer, and the Internet via the network. The display unit 205 is a display unit that displays various information and is constituted by a liquid-crystal panel or the like. In the present embodiment, the operating unit 202 and the display unit 205 have the same configuration, with which both of reception of user operation and display of various information can be performed. In other words, the operating unit 202 and the display unit 205 are constituted by a touch display.

Users can operate the mobile terminal 100 by providing various instructions to the mobile terminal 100 by sliding or tapping a finger or the like along or on the touch display. Users can also provide various instructions to the mobile terminal 100 by, for example, operating the touch display with an operation member other than a finger like an electrostatic touch panel pen such as a stylus pen. The mobile terminal 100 can include an operating unit other than the touch display, such as physical keys.

As illustrated in FIG. 1B, the mobile terminal 100 includes an OS 207 and at least one application (application 208). The application 208 runs via the OS 207. Such software is stored in the storage unit 206, is expanded in the memory 204, and is executed by the CPU 201. Applications of the mobile terminal 100 are installed via, for example, a network.

Figure 2A:
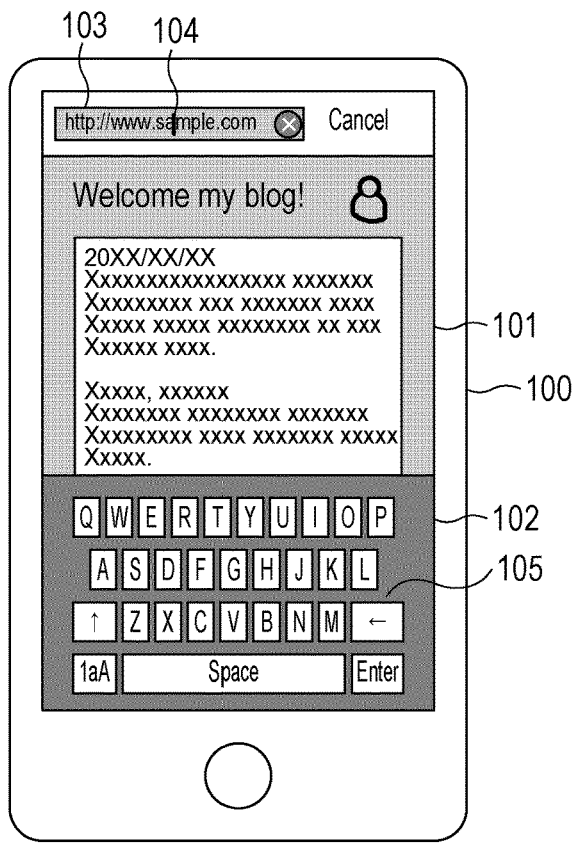
FIG. 2A is a diagram illustrating a screen displayed on the information processing apparatus according to the first embodiment.
Figure 2B:
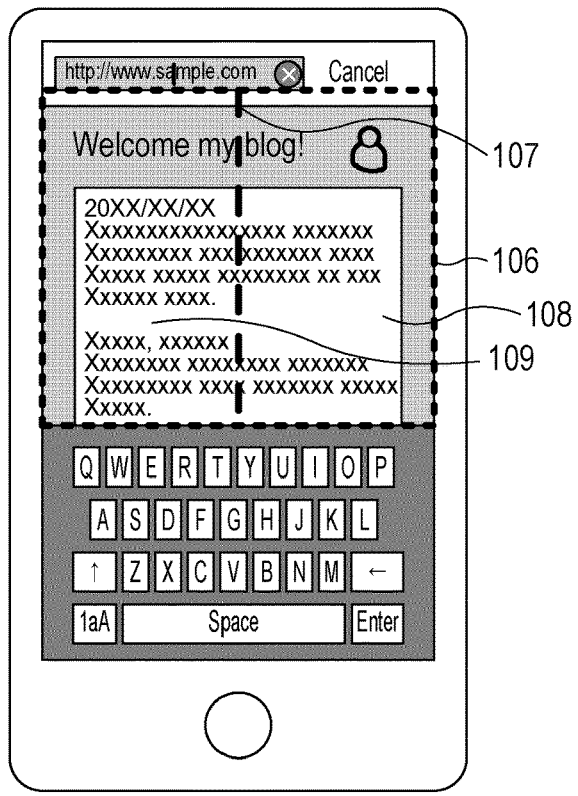
FIG. 2B is a diagram illustrating a screen displayed on the information processing apparatus according to the first embodiment.

FIGS. 2A and 2B are diagrams illustrating a screen displayed on a display portion 101 according to an application installed in the mobile terminal 100. The display portion 101 corresponds to the display unit 205 in FIG. 1A and is constituted by a display having an LCD-type display mechanism. In the present embodiment, an area in which the display portion 101 can display a screen corresponds to a display area. The operating portion 102 corresponds to the operating unit 202 in FIG. 1A. The operating portion 102 has a touch-panel type operating mechanism and detects an input from the user. In other words, the present embodiment has a configuration in which the operating portion 102 constituted by a touch panel is placed on the display portion 101 constituted by an LCD, and in which the display portion 101 and the operating portion 102 are combined as a unit.

The display portion 101 displays a cursor display area 103 and a position indication cursor 104. The cursor display area 103 is an area in which the position indication cursor 104 can be displayed and moved. For example, a URL input area for a WEB browser. The cursor display area 103 is not limited to an area in which characters can be input and includes an area in which no character can be input but the position indication cursor 104 can be displayed, such as an area in which a PDF document is displayed.

The position indication cursor 104 is a cursor displayed between letters displayed in the cursor display area 103 and clearly indicates a position at which the user inputs a letter or a position between letters selected by the user. The position indication cursor 104 is displayed in the cursor display area 103 in a case that a predetermined operation for displaying the position indication cursor 104 is performed on the display portion 101, so that the screen displayed by the display unit 205 shifts to a letter input mode. An example of the predetermined operation for displaying the position indication cursor 104 is a tap operation on the cursor display area 103. However, a predetermined operation for displaying the position indication cursor 104 is not limited to the above operation. In other embodiments, the predetermined operation is a tap operation on a predetermined key on a keyboard (described later) or an operation on an area other than the cursor display area 103.

The display portion 101 displays a keyboard 105 including keys for executing input and deletion of letters, movement of the position indication cursor 104, and other operations. In a case that the user operates a key on the keyboard 105, for example, input of a letter to the cursor display area 103, deletion of a letter displayed in the cursor display area 103, movement of the position indication cursor 104, or another operation is executed based on the operated key. At that time, the position indication cursor 104 moves to a position corresponding to the input or deletion of the letter.

In a case that the user operates the cursor display area 103 in a state in which the position indication cursor 104 is displayed in the cursor display area 103, the position indication cursor 104 moves to the operated position in the operated area. In the present embodiment, the position indication cursor 104 moves according to a key operation on the keyboard 105, an operation on the cursor display area 103, or an operation on a cursor operation area 106 (described later).

In the present embodiment, the keyboard 105 is a soft keyboard displayed on the display portion 101 by, for example, the OS 207 installed in the mobile terminal 100. Alternatively, the keyboard 105 can be a physical keyboard. In this case, the keyboard 105 can be disposed at a portion on the mobile terminal 100 other than the display portion 101 or can be connected to the mobile terminal 100 via a USB port or the like.

The setting of an area in the present embodiment includes displaying the area and activating an operation on the area. More specifically, the application 208 of the present embodiment sets a rectangular area in the display portion 101, which circumscribes the cursor display area 103, the keyboard 105, and the right and left sides of the display portion 101, as the cursor operation area 106. The cursor operation area 106 is an area for receiving a user operation to move the position indication cursor 104. The cursor operation area 106 is set to include, in the display area, at least an area other than the keyboard 105 and an area other than the cursor display area 103 in which the position indication cursor 104 displayed at the setting of the cursor operation area 106 can move. For that reason, if a plurality of cursor display areas are present in the display area, the cursor operation area 106 can include a cursor display area in which the position indication cursor 104 displayed at that time cannot move.

The cursor operation area 106 includes a center line 107 that evenly divides the cursor operation area 106 into right and left portions. The cursor operation area 106 is set (activated), for example, in a case that the user taps the cursor display area 103 to display the position indication cursor 104. The cursor operation area 106 can be explicitly illustrated using a frame border or the like, as illustrated in FIG. 2B. The fact that the cursor operation area 106 is set can be explicitly presented to the user by changing the color of the cursor operation area 106 or by displaying an icon.

In the cursor operation area 106, an area on the right of the center line 107 is set as a right cursor operation area 108, and an area on the left of the center line 107 is set as a left cursor operation area 109. In other words, a plurality of areas for moving the position indication cursor 104 in any direction are set in the cursor operation area 106. The size and shape of the cursor operation area 106 are given for mere illustration, and any other size and shape can be applied. However, to improve the user-friendliness, the cursor operation area 106 should have a sufficient size, and can be larger than a key on the keyboard 105 for moving the position indication cursor 104.

In a case that the user taps the right cursor operation area 108, the position indication cursor 104 moves to the right by one letter from the position before movement. In a case that the user taps the left cursor operation area 109, the position indication cursor 104 moves to the left by one letter from the position before movement. Even if the left cursor operation area 109 is tapped in a case that the position indication cursor 104 is on the left of the possible input position, the position indication cursor 104 does not move to the left. Even if the right cursor operation area 108 is tapped in a case that the position indication cursor 104 is on the right of the possible input position, the position indication cursor 104 does not move to the right. The areas set in the cursor operation area 106 are not limited to the right cursor operation area 108 and the left cursor operation area 109. Alternatively, any other areas for moving the position indication cursor 104 in directions other than right and left can be set. For example, an upper cursor operation area and a lower cursor operation area.

The set cursor operation area 106 is cancelled in a case that the display of the position indication cursor 104 is cancelled. Specifically, the cursor operation area 106 is cancelled, for example, in a case that an operation on an area other than the cursor operation area 106, the cursor display area 103, and the keyboard 105 is performed or in a case that an operation on a predetermined area for cancelling the cursor operation area 106 is performed.

Thus, in the present embodiment, in a case that a tap operation on the cursor operation area 106 is performed, the position indication cursor 104 is moved in a direction according to the tapped area. The tap operation refers to an operation for bringing an operation member into momentary-contact with an area in the display area. In the present embodiment, the tap operation on a predetermined area refers to an operation for bringing an operation member into direct-contact with the predetermined area in a state in which an operation using an operation member is not performed on the display area. In other words, the tap operation refers to an operation for bringing an operation member into contact with the predetermined area without sliding the operation member that is in contact with an area other than the predetermined area. Alternatively, in a case that the pressed cursor operation area 106 is pressed for a long time, the position indication cursor 104 can be continuously moved by a distance and in a direction corresponding to the pressed area.

As illustrated in FIG. 2B, the cursor operation area 106 occupies most of the display portion 101 other than the keyboard 105 and the cursor display area 103. This enables the user to easily and accurately provide an input for moving the position indication cursor 104 to the right and left. Since the cursor operation area 106 is an area other than the cursor display area 103, the position indication cursor 104 is not hidden by a finger during inputting. This reduces difficulty in recognizing the position indication cursor 104.

FIG. 3 is a flowchart for a process of setting the cursor operation area 106 and controlling display of the position indication cursor 104. The process in the flowchart illustrated in FIG. 3 can be implemented by, for example, the CPU 201 reading a program stored, for example, in the storage unit 206, to the memory 204 and executing it.

First, at step S301, the CPU 201 shifts a screen displayed by the display unit 205 to a character input mode. The character input mode is a mode to which the screen shifts in a case that the user taps the cursor display area 103. This mode is used in a case that the user enters or deletes a character to or from the cursor display area 103. In a case that the screen displayed by the display unit 205 shifts to the character input mode, the CPU 201 displays the position indication cursor 104 and the keyboard 105 on the display unit 205. If the cursor display area 103 is an area in which no character can be input, only the position indication cursor 104 is displayed according to a position at which a user operation is received.

At step S302, the CPU 201 sets a rectangular area that circumscribes the frame of the cursor display area 103, the frame of the keyboard 105, and the right and left side frames of the display portion 101 as the cursor operation area 106. At step S303, the CPU 201 divides the cursor operation area 106 along the center line 107 into right and left areas and sets the right area as the right cursor operation area 108 and the left area as the left cursor operation area 109.

At step S304, the CPU 201 detects an operation performed on the operating unit 202, which is a possible operation area on the display unit 205, and performs the processes of the subsequent steps according to the detection result. If the CPU 201 has not detected a process on the operating unit 202, then the CPU 201 performs the process at step S304 again and waits for a process on the operating unit 202.

If at step S304 the CPU 201 has detected a tap on the right cursor operation area 108, then at step S305 the CPU 201 determines whether the cursor can be moved to the right. This determination is made by determining whether the position indication cursor 104 is at the right end of the possible input position. If the CPU 201 determines that the cursor cannot be moved to the right, the CPU 201 performs the process at step S304 again and waits for an operation on the operating unit 202. If the CPU 201 determines that the cursor can be moved to the right, then at step S306 the CPU 201 causes the display unit 205 to display a screen in which the position indication cursor 104 is moved by one letter to the right. Thereafter, the CPU 201 performs the process at step S304 again and waits for an operation on the operating unit 202.

If at step S304 the CPU 201 detects a tap on the left cursor operation area 109, then at step S307 the CPU 201 determines whether the cursor can be moved to the left. This determination is made by determining whether the position indication cursor 104 is at the left end of the possible input position. If the CPU 201 determines that the cursor cannot be moved to the left, the CPU 201 performs the process at step S304 again and waits for an operation on the operating unit 202. If the CPU 201 determines that the cursor can be moved to the left, then at step S308 the CPU 201 displays a screen in which the position indication cursor 104 is moved by one letter to the left. Thereafter, the CPU 201 performs the process at step S304 again and waits for an operation on the operating unit 202.

If at step S304 the CPU 201 detects a tap on a key on the keyboard 105, then at step S309 the CPU 201 causes the display unit 205 to display a display according to the tapped key. For example, if the CPU 201 detects a tap on a key for inputting a letter, the CPU 201 causes a letter corresponding to the key to be input to the cursor display area 103 and causes the display unit 205 to display a screen in which the position indication cursor 104 is moved by the number of letters input. If the CPU 201 detects a tap on a key for moving the position indication cursor 104, the CPU 201 causes the display unit 205 to display a screen in which the position indication cursor 104 is moved in a direction according to the key. After executing the processes at steps S306, S308, and S309, the CPU 201 performs the process at step S304 again and waits for an operation on the operating unit 202.

If at step S304 the CPU 201 detects an operation for terminating the character input mode is performed, then at step S310 the CPU 201 cancels the character input mode and causes the display unit 205 to display a screen in which the position indication cursor 104 and the keyboard 105 are hidden. Examples of the operation for terminating the character input mode include an operation of tapping a key for cancelling the character input mode on the keyboard 105 and an operation of tapping an area of the display unit 205 other than the keyboard 105, the cursor display area 103, and the cursor operation area 106.

Thus, in the present embodiment, the position indication cursor 104 moves by one letter every time the right cursor operation area 108 or the left cursor operation area 109 is tapped. This enables the user to easily move the cursor by a small number of letters. Furthermore, since there is no need for the user to perform an operation on the cursor display area 103 including the position indication cursor 104, the position indication cursor 104 is not hidden by a finger to reduce or eliminate difficulty in recognition. Furthermore, an area of the display portion 101 other than the cursor display area 103 and the keyboard 105 is generally sufficiently larger than the cursor display area 103 and a cursor shift key on the keyboard 105. Setting such a sufficiently large area as the cursor operation area 106 reduces possibility of user mis-operation due to a small operation area.

Figure 4A:
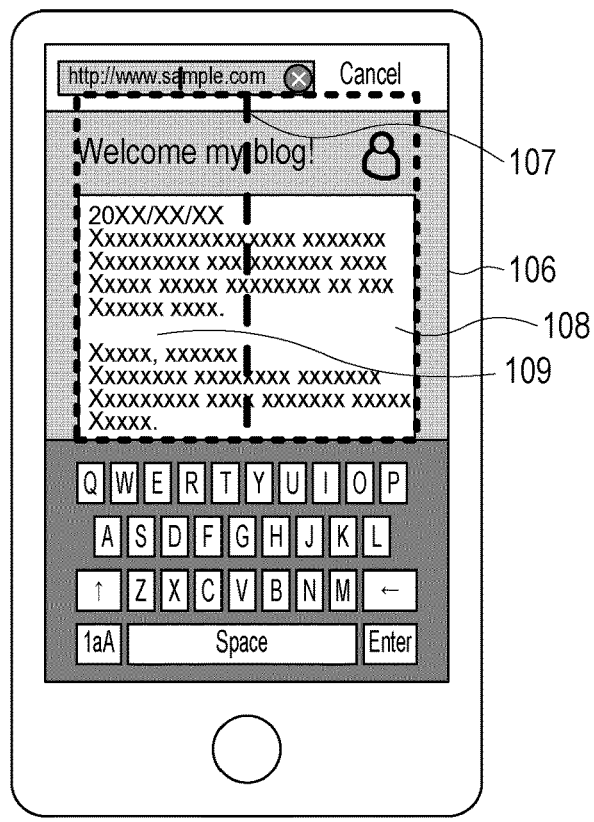
FIG. 4A is a diagram illustrating another example of a screen displayed on the information processing apparatus according to the first embodiment.
Figure 4B:
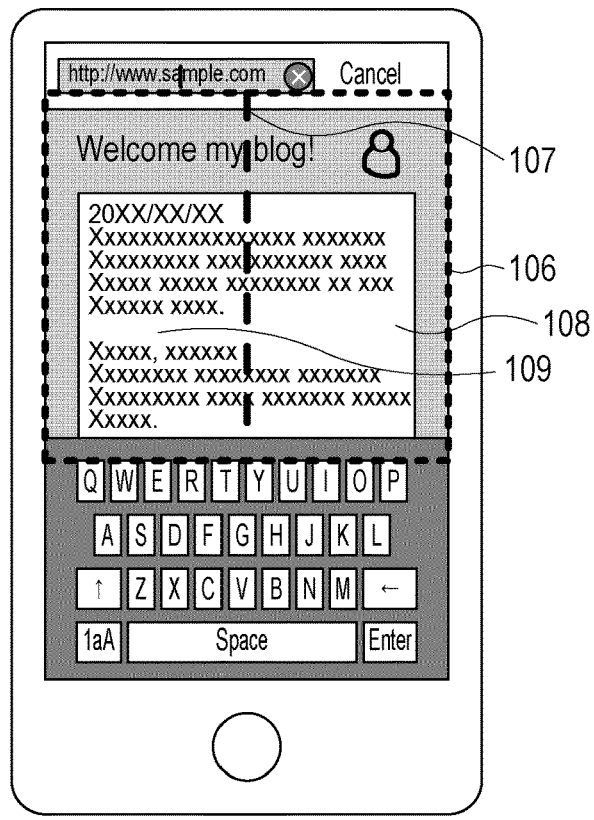
FIG. 4B is a diagram illustrating another example of a screen displayed on the information processing apparatus according to the first embodiment.

In the present embodiment, the shape of the cursor operation area 106 is set as a rectangle circumscribing the frame of the cursor display area 103, the frame of the keyboard 105, and the right and left side frames of the display portion 101. However, the shape of the cursor operation area 106 is not limited to the rectangle. For example, the cursor operation area 106 may not circumscribe the right and left side frames of the display portion 101, the frame of the cursor display area 103, and the frame of the keyboard 105, as illustrated in FIG. 4A. The cursor operation area 106 can overlap with those areas as long as the operability and function of the keyboard 105 are not impaired, as illustrated in FIG. 4B. In other words, the cursor operation area 106 can have any shapes that include at least an area of the display portion 101 other than the keyboard 105 and the cursor display area 103.

In a case that a user operation is performed on an area of the display portion 101 other than the cursor operation area 106, the CPU 201 can execute a primary process according to the area in which the operation is performed and the executed operation. If the area in which the operation is performed is a Web page, and if the executed operation is a display magnification operation, the primary process is, for example, a process of displaying a screen in which a Web page is magnified on the display portion 101. If the executed operation is a page scroll operation, the primary process is a process of displaying a screen in which a Web page is scrolled on the display portion 101.

In the present embodiment, the right cursor operation area 108 and the left cursor operation area 109 are set by dividing the cursor operation area 106 along the center line 107 into to two areas. However, the center line 107 may not be a line that divides the cursor operation area 106 into equal parts. For example, a line can be set to the right or left of the cursor operation area 106 according to the shape of the display portion 101. In a case that the cursor operation area 106 is pressed for a long time, the position indication cursor 104 can be kept moving.

In the present embodiment, the described processes are executed according to the program of the application 208. Alternatively, the processes can be executed according to the program of the OS 207. Alternatively, the described processes can be executed according to the program of the application 208 and the program of the OS 207. Specifically, for example, setting of the cursor operation area 106 and detection of a tap operation on the cursor operation area 106 may be performed according to the program of the application 208, and display and movement of the position indication cursor 104 can be performed according to the program of the OS 207.

Second Embodiment

In the first embodiment, the cursor operation area 106 has a size and a shape that do not impair the operability of the cursor display area 103 and the keyboard 105 so that the position indication cursor 104 can be moved in a state in which the cursor display area 103 and the keyboard 105 are operable. However, in a case that the display portion 101 is small or in a case that the cursor display area 103 and the keyboard 105 occupy most of the display portion 101, the cursor operation area 106 can be very small. This increases the possibility that the user mis-operates moving the position indication cursor 104. A second embodiment illustrates an example in which operability of moving a cursor can be improved regardless of the sizes of the display portion 101, the cursor display area 103, and the keyboard 105.

A cursor operation area 106 of the present embodiment will be described hereinbelow with reference to FIG. 5. The same components as those of the first embodiment are given the same reference signs, and redundant descriptions will be omitted.

Figure 5:
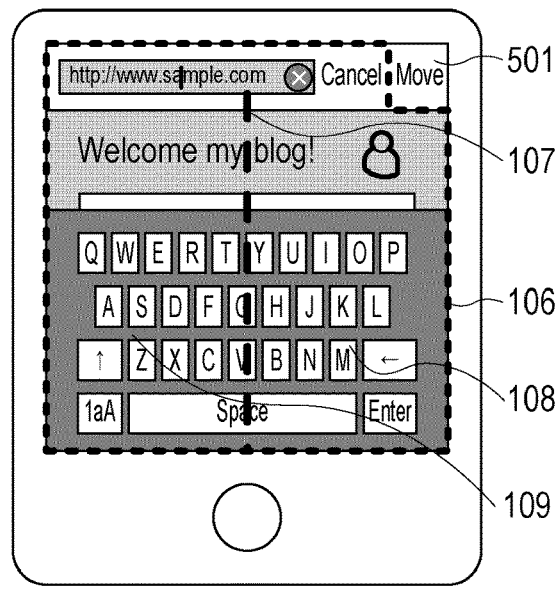
FIG. 5 is a diagram illustrating a screen displayed on an information processing apparatus according to a second embodiment.

In the present embodiment, as illustrated in FIG. 5, a cursor moving mode button 501 is displayed on the display portion 101. The cursor moving mode button 501 is a specific area including at least an area other than the cursor operation area 106. The application 208 of the present embodiment sets the cursor operation area 106 as an area of the display portion 101 excluding the cursor moving mode button 501. In the present embodiment, in a case that the position indication cursor 104 is displayed, the cursor moving mode button 501 is set, and in a case that the position indication cursor 104 is hidden from the display area, the setting of the cursor moving mode button 501 is cancelled.

A method for setting the right cursor operation area 108 and the left cursor operation area 109 is the same as that of the first embodiment. The cursor operation area 106 is set (activated) only while the cursor moving mode button 501 is kept pressed. For that reason, in a case that the user wants to move the position indication cursor 104, the user taps the cursor operation area 106 while pressing the cursor moving mode button 501. Specifically, for example, in a case that the user taps the right cursor operation area 108 while pressing the cursor moving mode button 501, the position indication cursor 104 moves by one letter to the right. In a case that the user taps the left cursor operation area 109 while pressing the cursor moving mode button 501, the position indication cursor 104 moves by one letter to the left. In a case that the user stops pressing the cursor moving mode button 501, the cursor operation area 106 disappears (is inactivated).

Thus, the present embodiment provides the cursor operation area 106 of a sufficient size even if the display portion 101 is small or even if the cursor display area 103 and the keyboard 105 occupy most of the display portion 101. In the present embodiment, the tap operation on a predetermined area refers to an operation of causing an operation member to directly touch the predetermined area in a state in which an operation using the operation member is performed on the cursor moving mode button 501.

In the present embodiment, the cursor operation area 106, the right cursor operation area 108, and the left cursor operation area 109 can be clearly shown using frame lines and by coloring. Although the cursor operation area 106 of the present embodiment is an area of the display portion 101 other than the cursor moving mode button 501, the cursor operation area 106 is not limited to particular areas. In other words, the cursor operation area 106 can have any size and shape that do not impair the operability. For that reason, there is no problem even if the cursor operation area 106 has the same size and shape as those of the keyboard 105.

Although the present embodiment has been described using an example in which the cursor moving mode button 501 is constantly displayed on the display portion 101, this is not intended to limit the present disclosure. For example, the cursor moving mode button 501 can be displayed in a case that the position indication cursor 104 is displayed (in a case that the screen shifts to the character input mode). The cursor moving mode button 501 can become hidden in a case that the position indication cursor 104 is hidden (in a case that the character input mode is cancelled). In this case, the display position of the keyboard 105 and so on can be adjusted in a case that the cursor moving mode button 501 is switched between showing and hiding.

In the present embodiment, the cursor operation area 106 is activated only while the cursor moving mode button 501 is being pressed. This is provided for mere illustration purposes and is not intended to limit the present disclosure. For example, setting (activation) and setting cancelling (inactivation) of the cursor operation area 106 can be switched every time the cursor moving mode button 501 is tapped once. This eliminates the need for the user to keep depressing the cursor moving mode button 501 when making an input to the cursor operation area 106. The tap operation on a predetermined area in the present embodiment refers to an operation for bringing an operation member into direct-contact with the predetermined area in a state in which an operation using an operation member is not performed on the display area.

Third Embodiment

In the first and second embodiments, for example, in a case that the right cursor operation area 108 is tapped, the position indication cursor 104 moves only by one letter to the right. For that reason, in a case that the user wants to move the position indication cursor 104 by a plurality of letters, the user needs to tap the cursor operation area 106 by the number of letters to be moved or to keep pressing the cursor operation area 106 for a long time. In contrast, in a third embodiment, the position indication cursor 104 can be moved by a plurality of letters with a small number of inputs.

Figure 6:
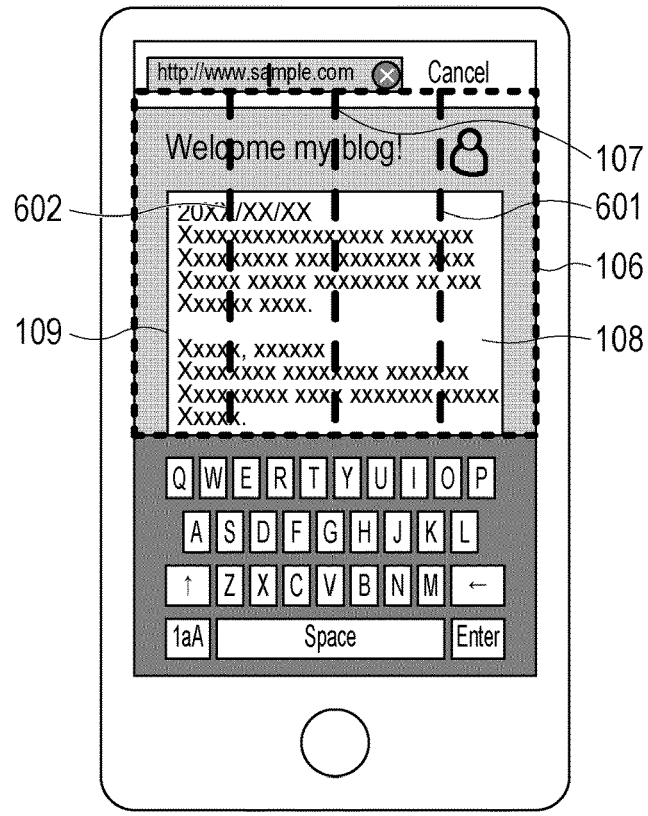
FIG. 6 is a diagram illustrating a screen displayed on an information processing apparatus according to a third embodiment.

A cursor operation area 106 set according to the application 208 of the third embodiment will be described with reference to FIG. 6. The same components as those of the above embodiments are given the same reference signs, and redundant descriptions will be omitted.

In the present embodiment, the amount of movement of the position indication cursor 104 in a case that the cursor operation area 106 is tapped depends on a distance from the center line 107 that divides the cursor operation area 106 into right and left areas to a position in the cursor operation area 106 tapped by the user. For example, if the area tapped by the user in the cursor operation area 106 is in the right cursor operation area 108 and on the left of a center line 601 of the right cursor operation area 108, the position indication cursor 104 moves by one letter to the right. If the area tapped by the user is an area on the right side of the center line 601 of the right cursor operation area 108, the position indication cursor 104 moves by two letters to the right. For example, if the area tapped by the user in the cursor operation area 106 is in the left cursor operation area 109 and on the right side of a center line 602 of the left cursor operation area 109, the position indication cursor 104 moves by one letter to the left. If the tapped area is an area on the left of the center line 602 of the left cursor operation area 109, the position indication cursor 104 moves by two letters to the left.

This configuration reduces the number of inputs and the input times to move the position indication cursor 104 by a plurality of letters as compared with the above embodiments. Specifically, to move the position indication cursor 104 by ten letters to the right, the first and second embodiments need ten taps, but the present embodiment needs only five taps.

In the present embodiment, the amount of movement of the position indication cursor 104 in a case that the cursor operation area 106 is tapped once is two letters at the maximum, but the maximum number of letters is not limited to two. In the present embodiment, the number of division of each of the right cursor operation area 108 and the left cursor operation area 109 is two, but the number of division is not limited to two. For example, the right cursor operation area 108 divided into three parts can correspond to the amounts of movement, one, two, and three letters from the left. Alternatively, the right cursor operation area 108 can be divided into more than three parts. The amount of movement does not need to be a net increase of one. For example, for division into two parts, the amount of movement may be one letters and ten letters from the left, and any other amount of movement is possible. Alternatively, in a case that the cursor operation area 106 is pressed for a long time, the position indication cursor 104 can be kept moved for that time by the amount of movement corresponding to the long-pressed area.

Fourth Embodiment

The first, second, and third embodiments have been described using an example in which the position indication cursor 104 is moved in the lateral direction. However, if the cursor display area 103 spans a plurality of lines, vertical movement is needed. In a fourth embodiment, an example of a cursor operation area 106 that allows the position indication cursor 104 to be moved also in the vertical direction will be described.

Figure 7:
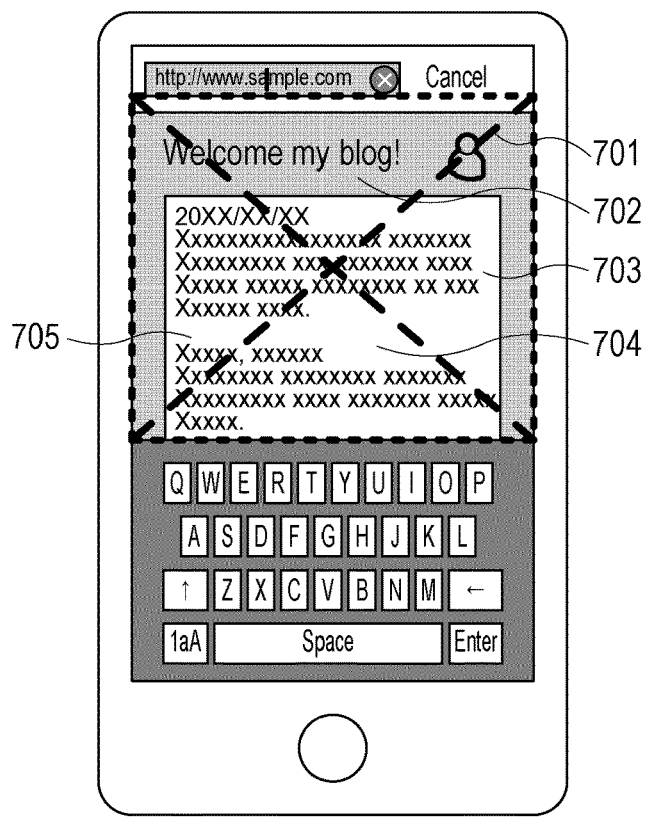
FIG. 7 is a diagram illustrating a screen displayed on an information processing apparatus according to a fourth embodiment.

A cursor operation area 106 set according to the application 208 of the fourth embodiment will be described with reference to FIG. 7. The same components as those of the above embodiments are given the same reference signs, and redundant descriptions will be omitted.

In the present embodiment, first, the cursor operation area 106 set similarly to the first embodiment is divided along diagonal lines 701. An area in contact with the upper frame of the cursor operation area 106 is set as an upper cursor operation area 702, an area in contact with the right frame is set as a right cursor operation area 703, an area in contact with the lower frame is set as a lower cursor operation area 704, and an area in contact with the left frame is set as a left cursor operation area 705. In a case that the upper cursor operation area 702 is tapped, the position indication cursor 104 moves upward by one line, and in a case that the lower cursor operation area 704 is tapped, the position indication cursor 104 moves downward by one line. In a case that the right cursor operation area 703 is tapped, the position indication cursor 104 moves by one letter to the right, and in a case that the left cursor operation area 705 is tapped, the position indication cursor 104 moves by one letter to the left. This configuration enables the position indication cursor 104 to also be moved in the vertical direction using the cursor operation area 106.

Although the present embodiment uses diagonal lines to divide the cursor operation area 106, a method of division is not limited to the above method. For example, the cursor operation area 106 can be divided into four areas in the lateral direction, in each of which an icon indicating top, bottom, left, and right can be clearly shown. Alternatively, for example, the cursor operation area 106 can be divided into three areas in the vertical direction, of which the top area is set as an upper cursor operation area, the bottom area is set as a lower cursor operation area, and the middle area is further divided into two areas in the lateral direction, of which the right area is set as a right cursor operation area, and the left area is set as a left cursor operation area.

Fifth Embodiment

In the first, second, third, and fourth embodiments, movement of the position indication cursor 104 is controlled using the cursor operation area 106. Alternatively, the present disclosure can be applied to a letter selection cursor. The letter selection cursor refers to a cursor displayed in a case that a plurality of continuous letters are to be selected and displayed at the start and the end of a selection area 809 indicating the range of selected letters. The letter selection cursor is displayed in a case that a screen displayed by the display unit 205 shifts to a letter selection mode, for example, in a case that the cursor display area 103 is pressed for a long time. In the letter selection mode, the keyboard may or may not be displayed. Hereinafter, a cursor at the starting end of the selection area 809 is referred to as a starting-end cursor 807, a cursor at the end of the selection area 809 is referred to as a termination cursor 808, and the starting-end cursor 807 and the termination cursor 808 are collectively referred to as a letter selection cursor.

Figure 8:
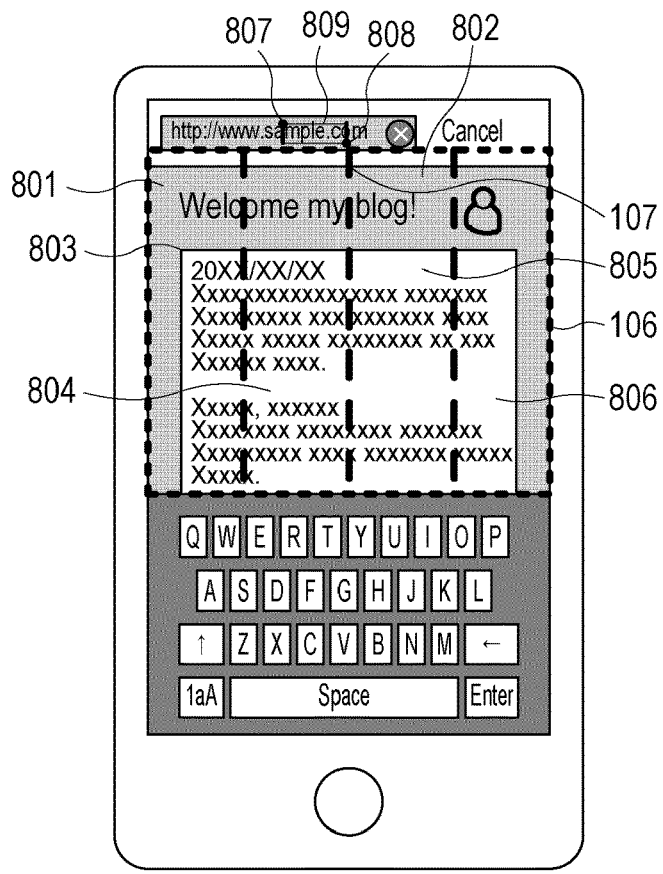
FIG. 8 is a diagram illustrating a screen displayed on an information processing apparatus according to a fifth embodiment.

A cursor operation area 106 set by the application 208 of the present embodiment will be described with reference to FIG. 8. The same components as those of the above embodiments are given the same reference signs, and redundant descriptions will be omitted.

In the present embodiment, the cursor operation area 106 determined as in the first embodiment is divided along the center line 107 into right and left areas. An area on the left side of the center line 107 is set as a starting-end-cursor operation area 801, and an area on the right side of the center line 107 is set as an end-cursor operation area 802. The starting-end-cursor operation area 801 is further divided into two areas, of which an area on the left is set as a left starting-end-cursor operation area 803, and an area on the right is set as a right starting-end-cursor operation area 804. The end-cursor operation area 802 is divided into two areas, of which an area on the left is set as a left end-cursor operation area 805, and an area on the right is set as a right end-cursor operation area 806.

In a case that the left starting-end-cursor operation area 803 is tapped, the starting-end cursor 807 moves by one letter to the left. In a case that the right starting-end-cursor operation area 804 is tapped, the starting-end cursor 807 moves by one letter to the right. In a case that the left end-cursor operation area 805 is tapped, the termination cursor 808 moves by one letter to the left, and in a case that the right end-cursor operation area 806 is tapped, the termination cursor 808 moves by one letter to the right.

This configuration enables both the position indication cursor 104 and the letter selection cursor to be moved using the cursor operation area 106.

Other Embodiments

The present disclosure is not limited to the above-described embodiments. The above-described embodiments can be combined. For example, movement of the position indication cursor 104 across a plurality of lines can be achieved at a tap by combining the third embodiment and the fourth embodiment. Alternatively, the first, second, third, or fourth embodiment and the fifth embodiment can be combined, so that in a case that the position indication cursor 104 is displayed, the cursor operation areas illustrated in the first and fourth embodiments are set, and in a case that the letter selection cursor is displayed, the cursor operation areas illustrated in the fifth embodiment are set.

As another alternative, the second embodiment and the first, third, fourth, or fifth embodiment can be combined, so that while the cursor moving mode button 501 is being pressed, the cursor display area 103 illustrated in the first, third, fourth, or fifth embodiment is set. In this configuration, the tap operation on a predetermined area refers to an operation to bring an operation member into direct-contact with the predetermined area in a state in which an operation using the operation member is performed on the cursor moving mode button 501.

Setting (activation) and setting cancellation (inactivation) of the cursor display area 103 illustrated in the first and the third to fifth embodiments can be switched every time the cursor moving mode button 501 is tapped once. The tap operation on a predetermined area in this configuration refers to an operation for bringing an operation member into direct-contact with the predetermined area in a state in which an operation using an operation member is not performed on the display area.

In the above-described embodiments, the processes are executed according to a program of the application 208, but the processes can be executed according to a program of the OS 207. Alternatively, the processes can be individually executed according to a program of the application 208 and a program of the OS 207. Specifically, for example, setting of the cursor operation area 106 and detection of a tap operation on the cursor operation area 106 can be performed according to a program of the application 208, and display and movement of the position indication cursor 104 can be performed according to a program of the OS 207.

The above-described embodiments are also achieved by executing the below-described processes. The processes include supplying software (programs) for implementing the functions of the above-described embodiments to a system or an apparatus via a network or various storage media and reading the programs and executing them with a computer (CPU, MPU, or the like) of the system or the apparatus. The programs can be executed by one computer or a plurality of computers in cooperation with one another. Not all of the above-described processes need to be implemented using software, and part or all of the processes can be implemented using hardware, such as an application specific integrated circuit (ASIC). All of the processes need not always be implemented by a single CPU, but can be implemented by a plurality of CPUs in cooperation with one another as appropriate.

The present disclosure improves user-friendliness in an operation for moving a cursor.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-044734 filed Mar. 8, 2016, which is hereby incorporated by reference herein in its entirety.

What is claimed is:

1. A method for controlling an information processing apparatus that displays a cursor between letters displayed in a display area, wherein the cursor is displayed in the display area in a case that a predetermined operation using an operation member is performed on the display area, the method comprising the steps of:

setting a cursor operation area in the display area, the cursor operation area being an area in which the cursor displayed in the display area is immovable and being an area other than a keyboard displayed in the display area; and receiving a tap operation using the operation member on the cursor operation area or an area in which the cursor is movable, wherein, in a case that the tap operation using the operation member is performed on the cursor operation area in a state in which the cursor is displayed in the display area, the cursor moves in a direction based on an area in the cursor operation area in which the tap operation is performed, and wherein, in a case that the tap operation using the operation member is performed on an area in which the cursor is movable in a state in which the cursor is displayed in the display area, the cursor moves to a position at which the tap operation is performed.

2. The method according to claim 1, wherein, in a case that a tap operation using the operation member is performed on the cursor operation area, the cursor moves in a direction based on an area in the cursor operation area in which the tap operation is performed by a predetermined distance corresponding to the area in the cursor operation area in which the tap operation is performed.

3. The method according to claim 1, wherein a first-direction operation area for moving the cursor in a first direction and a second-direction operation area for moving the cursor in a second direction different from the first direction are set in the cursor operation area, and wherein, in a case that a tap operation using the operation member is performed on the first-direction operation area, the cursor moves in the first direction, and in a case that a tap operation using the operation member is performed on the second-direction operation area, the cursor moves in the second direction.

4. The method according to claim 3, wherein the first direction is one of a rightward direction, a leftward direction, an upward direction, and a downward direction with respect to a position of the cursor before movement, and wherein the second direction differs from the first direction and is one of the rightward direction, the leftward direction, the upward direction, and the downward direction with respect to the position of the cursor before movement.

5. The method according to claim 1, wherein, in a case that a tap operation using the operation member is performed on the cursor operation area, the cursor moves by a distance depending on an area in the cursor operation area in which the tap operation is performed.

6. The method according to claim 1, wherein, in a case that a tap operation using the operation member is performed on an area in the cursor operation area and in a first distance away from a predetermined position in the cursor operation area, the cursor moves by a distance corresponding to the first distance, and wherein, in a case that a tap operation using the operation member is performed on an area in the cursor operation area and in a second distance longer than the first distance and away from a predetermined position in the cursor operation area, the cursor moves by a distance corresponding to the second distance.

7. The method according to claim 1, wherein a first-distance operation area for moving the cursor by a first distance in a first direction and a second-distance operation area for moving the cursor by a second distance different form the first distance in the first direction are set in the cursor operation area, and wherein, in a case that a tap operation using the operation member is performed on the first-distance operation area, the cursor moves by the first distance, and in a case that a tap operation using the operation member is performed on the second-distance operation area, the cursor moves by the second distance.

8. The method according to claim 1, wherein, in a case that a tap operation using the operation member is performed on the area of the display area in which the cursor is movable, the cursor is displayed in the display area.

9. The method according to claim 1, wherein, in a case that the cursor is displayed in the display area, the cursor operation area is set, and in a case that the cursor is not displayed in the display area, the cursor operation area is not set.

10. The method according to claim 1, wherein a specific area including at least an area other than the cursor operation area of the display area is set, and wherein, in a state in which an operation on the specific area is performed, the cursor operation area is set, and in a state in which an operation on the specific area is not performed, the cursor operation area is not set.

11. The method according to claim 10, wherein, in a case that the cursor is displayed in the display area, the specific area is set, and in a case that the cursor is not displayed in the display area, the specific area is not set.

12. The method according to claim 1, wherein a specific area including at least an area other than the cursor operation area of the display area is set, and wherein, in a case that an operation on the specific area is performed in a state in which the cursor operation area is not set, the cursor operation area is set, and in a case that an operation on the specific area is performed in a state in which the cursor operation area is set, setting of the cursor operation area is cancelled.

13. The method according to claim 1, wherein, in a case that an input to the keyboard displayed in the display area is made, a letter based on the input is input to a position of the cursor.

14. The method according to claim 1, wherein the cursor operation area is larger than a key on the keyboard, and wherein the key is used to move the cursor.

15. The method according to claim 1, wherein the area in which the cursor is movable comprises a URL input area.

16. An information processing apparatus that displays a cursor between letters displayed in a display area, wherein the cursor is displayed in the display area in a case that a predetermined operation using an operation member is performed on the display area, the apparatus comprising:

a setting unit configured to set a cursor operation area in the display area, the cursor operation area being an area in which the cursor displayed in the display area is immovable and being an area other than a keyboard displayed in the display area; and a receiving unit configured to receive a tap operation using the operation member on the cursor operation area or an area in which the cursor is movable, wherein, in a case that the tap operation using the operation member is performed on the cursor operation area in a state in which the cursor is displayed in the display area, the cursor moves in a direction based on an area in the cursor operation area in which the tap operation is performed, and wherein, in a case that the tap operation using the operation member is performed on an area in which the cursor is movable in a state in which the cursor is displayed in the display area, the cursor moves to a position at which the tap operation is performed.

17. A non-transitory computer-readable storage medium storing a readable program for operating a computer to execute a method for controlling an information processing apparatus that displays a cursor between letters displayed in a display area, wherein the cursor is displayed in the display area in a case that a predetermined operation using an operation member is performed on the display area, the method comprising the steps of:

setting a cursor operation area in the display area, the cursor operation area being an area in which the cursor displayed in the display area is immovable and being an area other than a keyboard displayed in the display area; and receiving a tap operation using the operation member on the cursor operation area or an area in which the cursor is movable, wherein, in a case that the tap operation using the operation member is performed on the cursor operation area in a state in which the cursor is displayed in the display area, the cursor moves in a direction based on an area in the cursor operation area in which the tap operation is performed, and wherein, in a case that the tap operation using the operation member is performed on an area in which the cursor is movable in a state in which the cursor is displayed in the display area, the cursor moves to a position at which the tap operation is performed.

* * * * *